(12) United States Patent
Hymes (10) Patent No.: US 8,521,185 B2
(45) Date of Patent: Aug. 27, 2013

(54) WIRELESS COMMUNICATIONS WITH VISUALLY-IDENTIFIED TARGETS

(76) Inventor: Charles Martin Hymes, Eugene, OR (US)

( * ) Notice: Subject to any disclaimer, the term of this patent is extended or adjusted under 35 U.S.C. 154(b) by 1042 days.

(21) Appl. No.: 11/061,940

(22) Filed: Feb. 19, 2005

(65) Prior Publication Data

US 2005/0191963 A1 Sep. 1, 2005

Related U.S. Application Data (60) Provisional application No. 60/548,410, filed on Feb. 28, 2004, provisional application No. 60/603,716, filed on Aug. 23, 2004, provisional application No. 60/612,953, filed on Sep. 24, 2004, provisional application No. 60/654,345, filed on Feb. 19, 2005.

(51) Int. Cl.
*H04Q 7/20* (2006.01)

(52) U.S. Cl.
USPC .............. 455/456.3; 455/456.1; 455/414.2; 455/414.3; 455/41.2; 455/414.1; 713/186; 379/201.06; 379/207

(58) Field of Classification Search
USPC ............... 709/206, 207, 217, 219; 455/461, 455/466, 456.1, 456.2, 456.3, 459, 414.3, 455/566, 567, 41.2, 414.1; 342/450; 340/149, 340/825.34, 825; 379/32, 204, 93, 92, 201.06, 379/207, 88, 207.1; 707/104.1; 235/375
See application file for complete search history.

(56) References Cited

U.S. PATENT DOCUMENTS

| | | | |
|---|---|---|---|
| 5,793,630 A | 8/1998 | Theimer et al. | |
| 5,901,236 A | 5/1999 | Mizui | |
| 5,950,200 A * | 9/1999 | Sudai et al. | 1/1 |
| 6,052,122 A * | 4/2000 | Sutcliffe et al. | 715/751 |
| 6,351,640 B1 | 2/2002 | DeMont | |
| 6,618,593 B1 | 9/2003 | Drutman et al. | |
| 6,798,349 B1 | 9/2004 | Richley et al. | |
| 6,819,919 B1 | 11/2004 | Tanaka | |
| 2001/0046657 A1 | 11/2001 | Dorn | |
| 2002/0104002 A1* | 8/2002 | Nishizawa et al. | 713/168 |
| 2003/0060168 A1 | 3/2003 | Teibel | |
| 2003/0078976 A1* | 4/2003 | Gordon | 709/205 |
| 2003/0179399 A1* | 9/2003 | Matsunoshita | 358/1.13 |
| 2004/0034799 A1* | 2/2004 | Mikami | 713/201 |
| 2004/0116106 A1 | 6/2004 | Shishido et al. | |
| 2004/0128062 A1 | 7/2004 | Ogino et al. | |
| 2004/0161246 A1 | 8/2004 | Matsushita et al. | |
| 2004/0220922 A1* | 11/2004 | Lovison et al. | 707/3 |
| 2005/0021750 A1* | 1/2005 | Abrams | 709/225 |
| 2005/0054352 A1* | 3/2005 | Karaizman | 455/456.3 |
| 2005/0076078 A1 | 4/2005 | Salton | |

OTHER PUBLICATIONS

Janet Kornblum, Cellphones do a new number with 'texting', USA Today. McLean, Va.: Jun. 3, 2003. p. D.07, http://proquest.umi.com/pqdweb?did=343433831&sid=1&Fmt=3&clientId=19649&RQT=309&VName=PQD.*

(Continued)

*Primary Examiner* — Patrick Edouard
*Assistant Examiner* — Fred Casca (57) ABSTRACT

A mechanism for initiating contact with someone, via a telecommunications system, who is in the admirer's proximity, but whose identity or telecommunications address (e.g., telephone number, e-mail address, etc.) is unknown. The illustrative embodiments enable the user to use what information he does know about the admired person—the admiring person's distinguishing characteristics—to get a telecommunications address through which the initial contact can be made.

38 Claims, 9 Drawing Sheets

(56) References Cited

OTHER PUBLICATIONS

SMS/Text Messaging UK Personals, ExploreLove.co.uk, © 2003-2004, http://www.explorelove.co.uk/sms_text_dating.htm.*
Brad Stone, Your Next Computer, Newsweek Next Frontiers, Jun. 7, 2004 Issue, MSNBC News.
What is WhoAt?, WhoAt Help-Tour, http://www.whoat.com/go/d/tour1/, Tangient LLC.
Gerd Kortuem et al.,When Peer-to-Peer comes Face-to-Face: Collaborative Peer-to-Peer Computing in Mobile Ad Hoc Networks, Wearable Computing Group Department of Computer and Information Science University of Oregon, kortuem@cs.uoregon.edu, Eugene, Oregon, USA.
Rachel Dodes, When a Stranger Calls, From Afar or Nearby, The New York Times, nytimes.com, Mar. 24, 2005, http://nytimes.com/2005/03/24/technology/circuits/24blue.html.
What is partyBAPP?, PartyBAPP, info@partyBAPP.com.
What is Crunkie, Crunkie, http://www.crunkie.com/helpWhatIs, Wavemarket, Inc.
Jane Weaver, Video, Voice and Instant Gratification, Technology and Science Online Dating, Sep. 26, 2002, MSNBC Interactive.
Michael Kanellos, Under-the-Skin ID Chips Move Toward U.S. Hospitals, Jul. 27, 2004, http://zdnet.com.com/2100-1103-5285815.html, CNET News.com.
Michael Holden, Toothing' for Hi-Tech Sex with Strangers, Yahoo!News, Apr. 19, 2004.
Eric Paulos et al., The Familiar Stranger: Anxiety, Comfort, and Play in Public Places, CHI 2004, Apr. 24-29, 2004, Vienna, Australia.
Socializer, Alphaworks, Aug. 18, 2003, http://www.alphaworks.ibm.com/tech/socializer, IBM.
Eric Bender, Social Lives of a Cell Phone, an MIT Enterprise Technology Review, Jul. 12, 2004, http://technologyreview.com/articles/04/07/wo-bender071204.asp?p=1.
Ed White, Smart Card Matches Up People, Market Wire, Feb. 18, 2000, http://www.matchupsingles.com, Interactive Digital Corporation, Phoenix, Arizona.
Serendipity: Taking the Chance out of Chance Encounters, www.mobule.net.
Secretadmirer.com The Electronic Cupid, 1997-2004, Likewise Media, Inc.
Michael Stroud, Ring Ring: 'How 'Bout a Date?', Wired News, May 29, 2001, http://www.weird.com/news/wireless/0,1382,43900,00.html, Lycos, Inc.
Ben Charny, RFID Cell Phones Take Shape at Nokia, CNET News.com, Oct. 24, 2004, http://news.zdnet.com/2100-1035 22-5424528.html.
Daniel Terdiman, MoSoSos Not So So-So, Wired News, Mar. 8, 2005, http://Wired-vig.wired.com/news/print/0,1294,66813,00.html, Lycos, Inc.
Send Messages for Free and Meet People with your Mobile Phone, Mobiluck, http://www.mobiluck.com/index.php?page=accueil, MobiLuck 2003.
Mobile Phone to Recognize Their Owners' Faces, Yahoo!News, Mar. 4, 2005, Agence France Presse.
Meeting Point, Net-Cell.com, http://www.net-cell.com/MP/index.html.
Meet Me at . . . Hot or Not, http//meetme.hoornot.com/#home, 2000-2005, Eight Days, Inc.
Reuters, Match.com, AT&T Wireless Hook up for love, Feb. 11, 2003, Reuters Limited.
Cliff Randell et al., Low Cost Indoor Positioning System, Department of Computer Sciences, University of Bristol, UK.
Jabberwocky, A mobile phone application for visualizing our urban Familiar Strangers, http://www.urban-atmospheres.net/Jabberwocky/demo.htm.
Mike Dempsey, Indoor Positioning Systems in Healthcare, A Basic Overview of Technologies, Radianse, Inc., Jun. 23, 2003, Lawrence, MA.
Mamjam, How to Use Mamjam, Mamjam, http://mamjam.com/howto.asp, The Mamjam Technology Platform Partnership LLP.
Flirtylizer—The First Mobile Dating Service with Positioning, Feb. 13, 2001, http://www.bluefactory,com.
Zhanna Shamis et al., Encounter Bubbles, May 15, 2004, http://seansavage/encounter-bubbles/, Berkeley INFOSYS 247: Information Visualization.
Ekahau Positioning Engine 2.1, Accurate Location in Wireless Networks, Ekahau, Inc.
Johan Redstrom et al., Designing for Local Interaction, Springer-Verlag., pp. 55-78.
Douglas Heingartner, Connecting Paper and Online Worlds by Cellphone Camera, The New York Times, Technology, Oct. 7, 2004.
Kevin Cullen, College Students use thefacebook.com to Connect, Journal and Courier, http://cgi.jconline.com/cgi-bin/, Federated Publication, Inc.
Libby Copeland, Click Clique: Facebook's Online College Community, Washington Post, Dec. 28, 2004, http://www.washingtonpost.com/ac2/wp-dyn/A30002-2004Dec27?1 . . . .
Sebastian Tong, BEDD Turns the Mobile Phone Into a Matchmaker in Singapore, The Wall Street Journal Online, Aug. 11, 2004, http://www.bedd.com/WSJ.html, Dow Jones & Company.
Activematch, ActiveMatch—The Location-Based Matchmaker, http://www.simeda.com/activematch.html.
Mike Hazas et al., A High Performance Privacy-Oriented Location System, PerCom 2003, pp. 216-223, Dallas-Fort Worth, USA, Mar. 2003.

* cited by examiner

WIRELESS COMMUNICATIONS WITH VISUALLY-IDENTIFIED TARGETS

CROSS REFERENCE TO RELATED APPLICATIONS

This application claims the benefit of:
i. U.S. Provisional Application 60/548,410, entitled "Handheld Communications Device For Making Initial Contact Based On Visual Identification," filed Feb. 28, 2004,
ii. U.S. Provisional Application 60/603,716, entitled "Device And System For Electronic Communications With Visually Identified Targets," filed Aug. 23, 2004,
iii. U.S. Provisional Application 60/612,953, entitled "Device And System For Wireless Communications With Visually Identified Targets," filed Sep. 24, 2004, and
iv. U.S. Provisional 60/654,345 entitled "Wireless Communications With Visually-Identified Targets," filed Feb. 19, 2005.

The underlying concepts, but not necessarily the nomenclature, of these applications are incorporated by reference.

FIELD OF THE INVENTION

The present invention relates to telecommunications in general, and, more particularly, to mobile social telecommunications.

BACKGROUND OF THE INVENTION

All potentially compatible people can be separated into two categories. The first category consists of all the people that one is not aware of because one has not met them, seen them, or even heard of them. This is the group addressed by online dating services, newspaper personal ads, and match makers in that they alert the individual to the existence of specific other individuals who may be compatible.

Newer technological developments that serve this same population are hand-held devices such as the Japanese Lovegety and the Spotme device that alert the user to potentially compatible people in the user's immediate environment that would have otherwise gone unnoticed. Even more recently a cellular telephone company, AT&T Wireless, in conjunction with an online dating service, Match.com, has offered a profile matching service to cellular telephone users that is activated when users are in the same physical proximity. All of these services alert the user to potentially compatible partners that the user otherwise would not know about.

The second category of people consists of all the people that one does in fact already know about because one has already met them, heard of them, or at least seen them. This group includes friends, classmates, colleagues, acquaintances, and the largest group—strangers that one becomes aware of in the normal course of everyday activity in a grocery store, elevator, subway train, restaurant, etc.

When it comes to having a relationship with someone among this second category, one is usually aware of which individuals one is interested in and which individuals one is not interested in. In this case, the issue then is not who to date, but rather how to go about making that happen. There is, therefore, a need to facilitate developing relationships with the people that one is already interested in.

SUMMARY OF THE INVENTION

The present invention facilitates the introduction to people with whom one is aware, without some of the costs and disadvantages of techniques for doing so in the prior art. To this end, the illustrative embodiment of the present invention addresses the three main obstacles that hinder people—admirers—from approaching others that they are attracted to—admired persons. The three obstacles are:

Invasiveness—If the admired person is a stranger, it may be awkward to approach him or her because the social circumstance may not be appropriate, conducive, or convenient to physically approach the person. For example, the admired person may be talking on the telephone, or talking to a group of friends. Some embodiments of the present invention address the invasiveness obstacle by providing a non-invasive mechanism for communication (e.g., text messaging, e-mail, etc.) between the admirer and the admired person.

Fear of Rejection—The fear of rejection hinders many admirers from approaching admired persons. If the admired person and the admirer already have a non-romantic relationship, such as that of co-workers, then the consequences of rejection can be quite significant. Some embodiments of the present invention address the fear of rejection obstacle by using additional entities (e.g., a data processing system, the admirer's and admired party's telecommunications terminals, etc.) to confide their interest in such that only when both persons express an interest in the other do the entities reveal to both of them their mutual attraction.

Fear of Embarrassment of Rejection—The fear of being embarrassed in front of one's friends hinders many admirers from approaching admired persons. Some embodiments of the present invention address the fear of embarrassment of rejection by enabling the admirer to initiate contact with the admired person via his or her telecommunications terminal, which is less conspicuous than approaching the admired person in front of one's friends.

To accomplish these goals, the illustrative embodiments provide a mechanism for initiating contact with someone, via a telecommunications system, who is in the admirer's proximity, but whose telecommunications address (e.g., telephone number, e-mail address, etc.) is unknown. The illustrative embodiments enable the user to use what information he does know about the admired person—the admired person's distinguishing characteristics—to determine a telecommunications address through which the initial contact can be made.

The first illustrative embodiment comprises: determining an address in the address space of a telecommunications network based on an image of a person; and directing a telecommunications terminal to reveal to a user of the telecommunications terminal at least a portion of a first message that is received from the address in particular, wherein the prior treatment for a message from the address and addressed to the user is to hide at least the portion of the message from the user.

DETAILED DESCRIPTION

Figure 1:
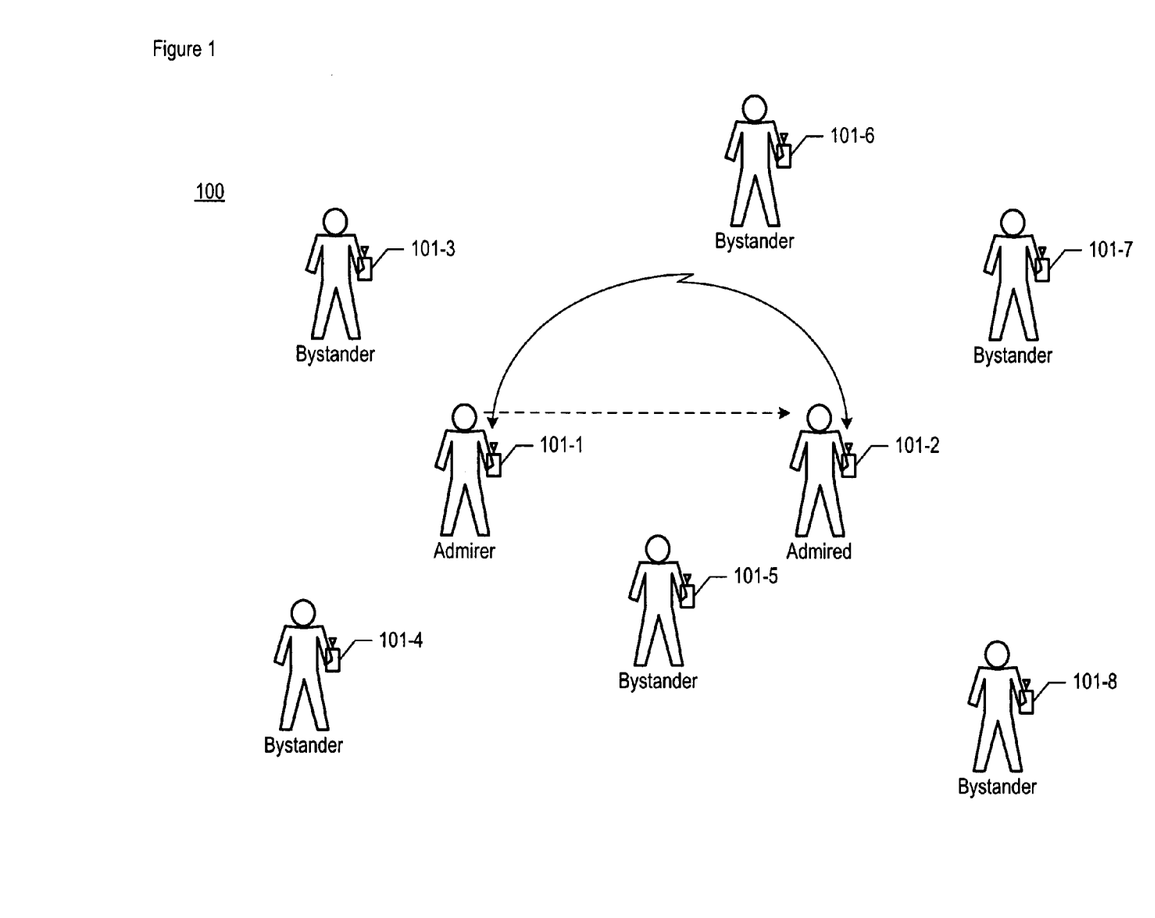
FIG. 1 depicts a diagram of an environment in which the first illustrative embodiment of the present invention operates.

FIG. 1 depicts a diagram of an environment in which the first illustrative embodiment of the present invention operates. Environment 100 is a gathering of eight people within line-of-sight proximity of each other. The fact that the people are within line-of-sight proximity of each other is a salient characteristic of the first illustrative embodiment because the embodiment facilitates the introduction of people who are in actual physical proximity to one another and can see each other.

One of the people in the gathering, the "First Person," sees another person, the "Second Person," and desires to anonymously initiate communications with him or her. The other people who are present at the gathering are merely bystanders.

In accordance with the first illustrative embodiment, each person carries a telecommunications terminal that facilitates the introduction of the First Person and the Second Person.

Figure 2:
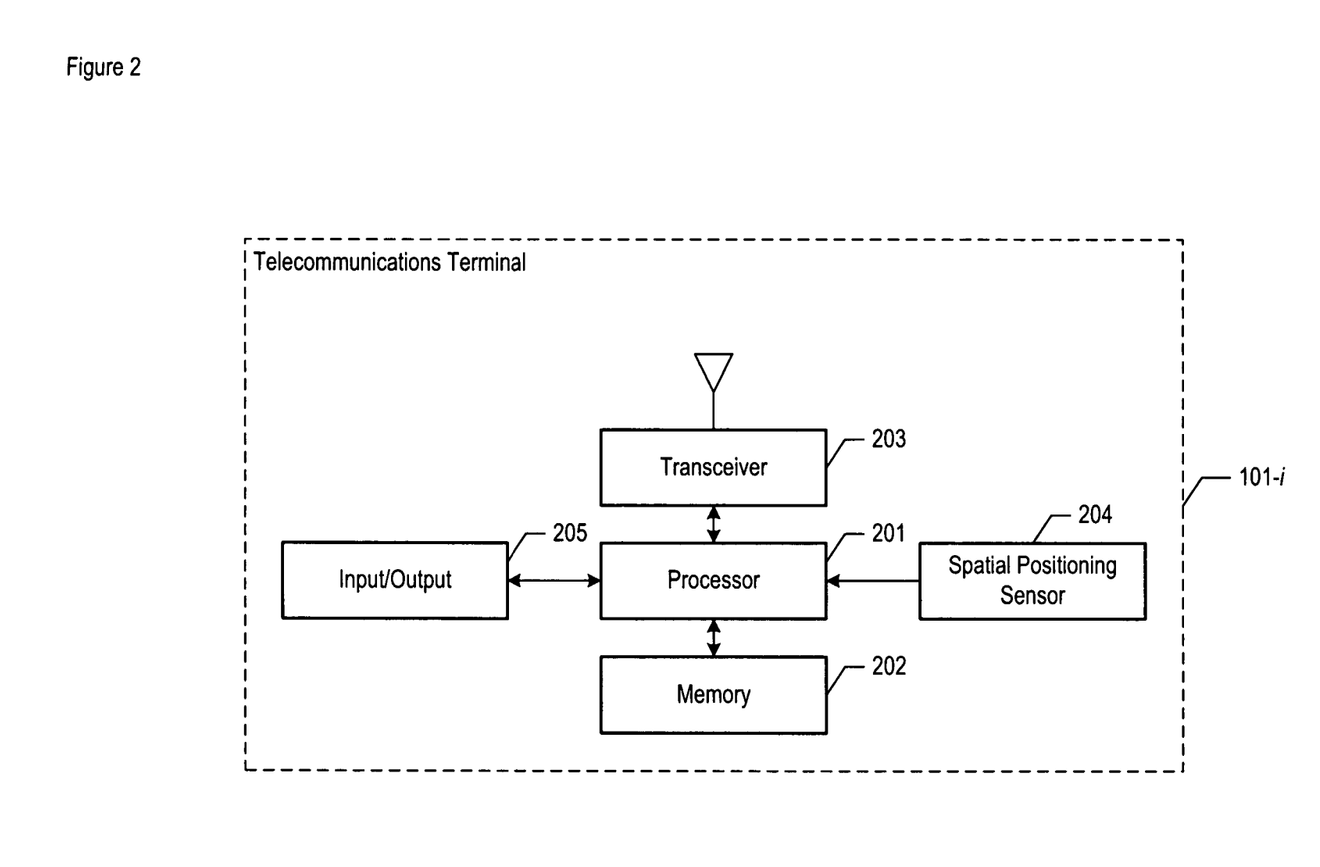
FIG. 2 depicts a block diagram of the salient components of wireless terminal 101-*i*, for i=1 through 8.

FIG. 2 depicts a block diagram of the salient components of wireless terminal 101-*i*, for i=1 through 8. In accordance with the first illustrative embodiment, wireless terminal 101-*i* is distinguishable and addressable by an address in the address space of the telecommunications system in which it functions. This is important because each user's terminal's address serves as an identifier for the user such that:

i. a message addressed to the address of a user's wireless terminal can be considered a message to the user, and     ii. a message from the address can be considered a message from the user.

Wireless terminal 101-*i* comprises processor 201, memory 202, transceiver 203, spatial positioning sensor 204, and input/output 205.

Processor 201 is a general-purpose processor, in well-known fashion, that is capable of interacting with memory 202, transceiver 203, and spatial positioning sensor 204 in well-known fashion, and that is additionally capable of performing the functionality described below and with respect to FIGS. 3 through 5.

Memory 202 is a non-volatile random-access memory, in well-known fashion, that stores the operating system and application software for processor 201. In accordance with the first illustrative embodiment, memory 202 also stores an image (e.g., a picture, etc.) of the user associated with the terminal.

Transceiver 203 is a bi-directional radio transceiver, in well-known fashion, that enables wireless terminal 101-*i* to communicate voice, text, and video with the other wireless terminals directly (e.g., through a Bluetooth network, etc.), through a base station (e.g., a WiFi access point, etc.) (not shown in FIG. 1), and with remote data processing systems that are accessible via a base station access point, etc.

Spatial positioning sensor 204 is a sensor (e.g., a Global Positioning System receiver, etc.), in well-known fashion, that is capable of ascertaining the spatial position (e.g., the latitude and longitude, etc.) of wireless terminal 101-*i*.

Input/output 205 comprises a keypad, display, camera, and acoustic transducers, in well-known fashion, which enable a user to communicate via voice, text, and video.

It will be clear to those skilled in the art, after reading this disclosure, how to make and use alternative embodiments of the present invention in which one or both of the First Person's terminal and the Second Person's terminal are wireline terminals. Furthermore, it will be clear to those skilled in the art, after reading this disclosure, how to make and use alternative embodiments of the present invention that are part of a different system (e.g., a wireless local area network, the Internet, a Bluetooth network, etc.) and, therefore, are distinguishable and addressable by an address (e.g., an IPV6 address, a MAC address, etc.) in a different address space. And still furthermore, it will be clear to those skilled in the art how to make and use alternative embodiments of the present invention for purposes other than dating and romance (e.g., to facilitate business dealings, etc.).

In accordance with the first illustrative embodiment, the First Person's terminal communicates at the physical layer directly with the Second Person's terminal without the assistance of a base station or intermediary. Furthermore, in accordance with the first illustrative embodiment, the First Person's terminal communicates at the application layer directly with the Second Person's terminal without the assistance of a third-party data processing system. In contrast, the second illustrative embodiment of the present invention, which is described in detail below, operates in conjunction with a data processing system.

In accordance with the first illustrative embodiment, each person's terminal continually runs software that enables the person to be both:

i. an admirer (i.e., anonymously initiate contact with an admired person), and     ii. an admired person (i.e., receive an anonymous message from an admirer).

Figure 3:
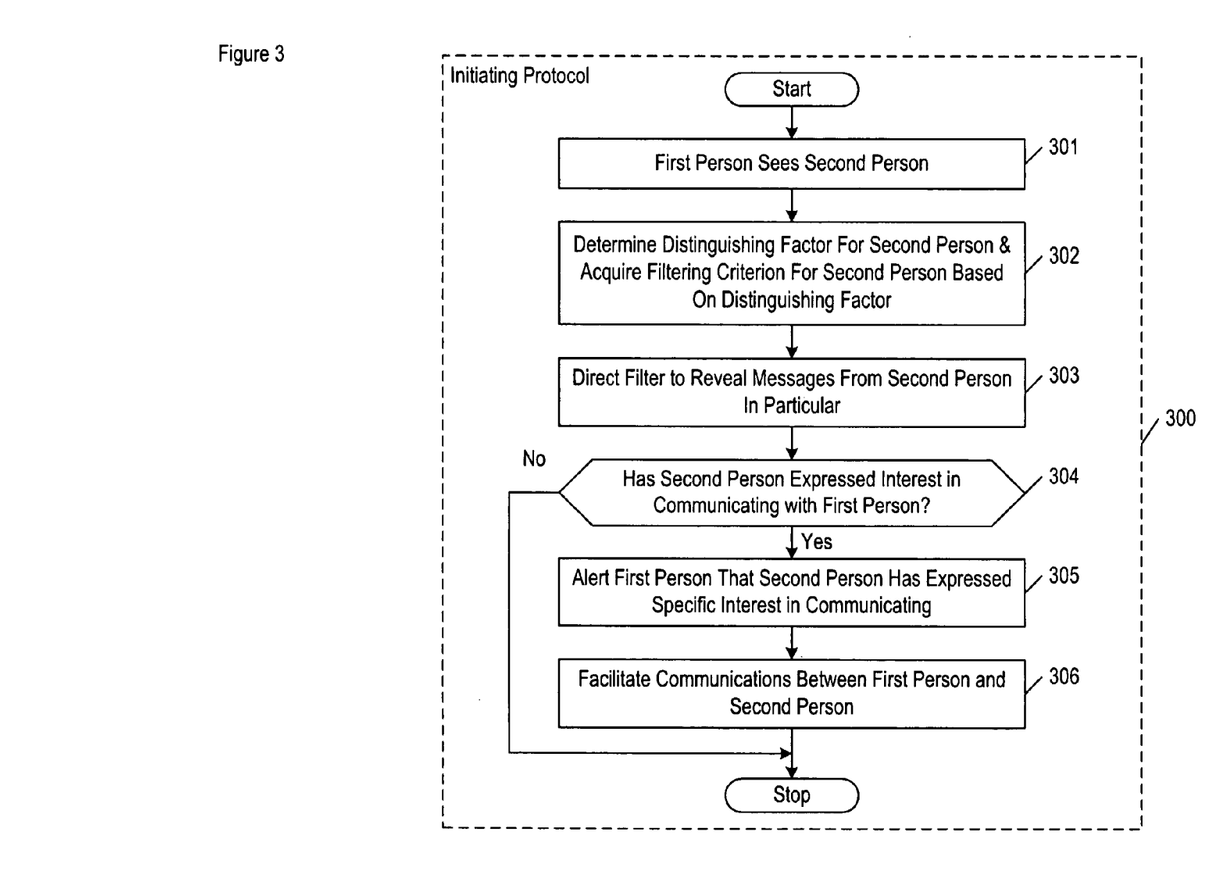
FIG. 3 depicts a flowchart of the salient tasks performed by a person's wireless terminal, in accordance with the first illustrative embodiment, to enable that person to be an admirer.
Figure 5:
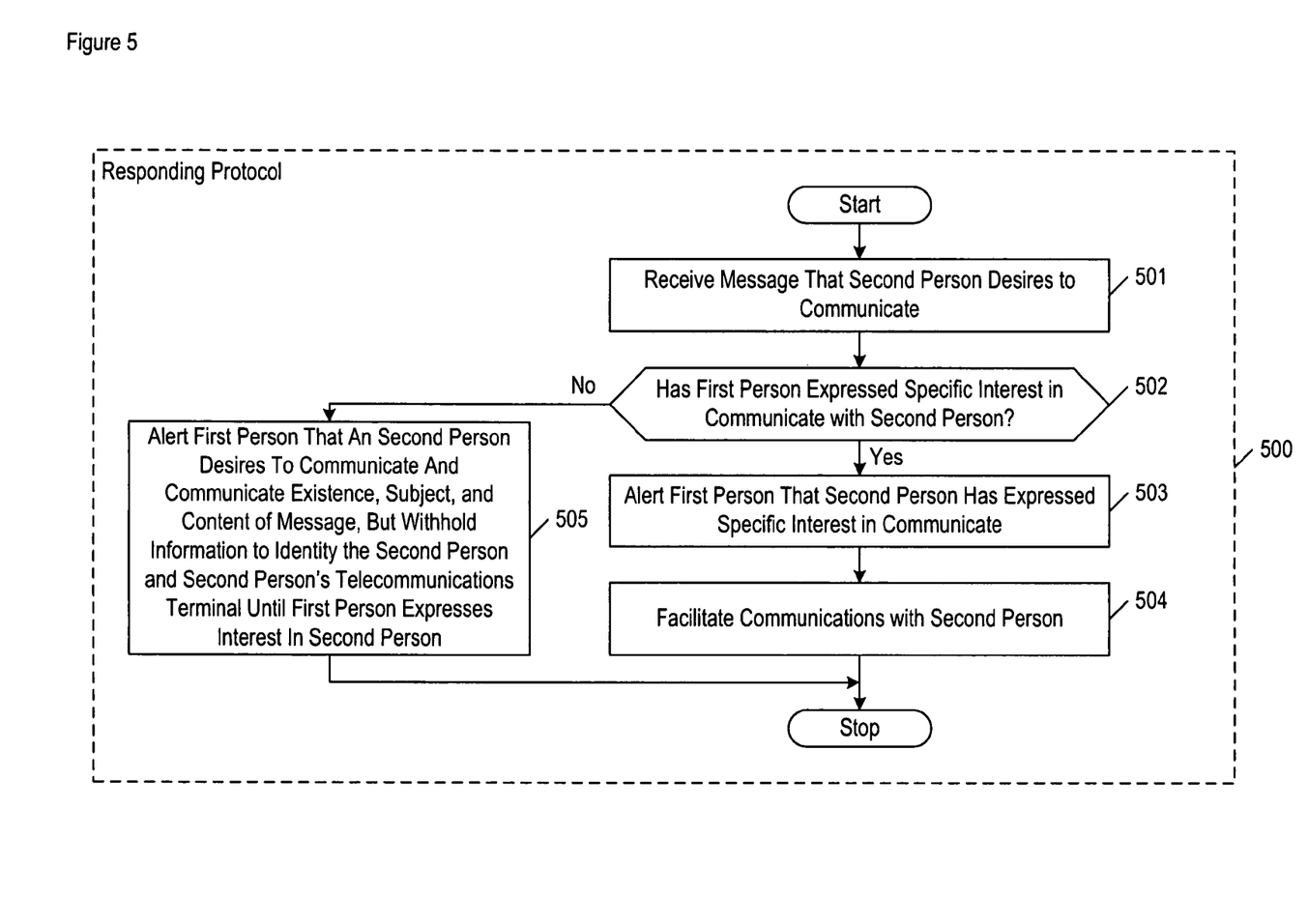
FIG. 5 depicts a flowchart of the salient tasks performed by a person's wireless terminal, in accordance with the first illustrative embodiment, to enable that person to be an admired person.

The functionality depicted in FIG. 3 enables a person, via his or her terminal, to be an admirer, and the functionality depicted in FIG. 5 enables a person, via his or her terminal, to be an admired person.

With respect to task 301 in FIG. 3, the First Person sees the Second Person.

At task 302, the First Person's terminal (i) acquires one or more distinguishing factors for the Second Person, and (ii) determines a filtering criterion based on the distinguishing factors.

For the purposes of this disclosure, a "distinguishing factor" is defined as information that distinguishes the Second Person from at least one other person. For example, the distinguishing factor includes, but is not limited to:

i. an indication of a physical trait of the Second Person (e.g., an image, a voiceprint, an iris scan, the person's genome, a fingerprint, a physical description, etc.), or     ii. an indication of the spatial position of the Second Person (e.g., the latitude and longitude of the Second Person, etc.), or     iii. an indication of the identity of the Second Person (e.g., a name, a social security number, a street address, etc.), or iv. an address of the Second Person in the address space of a telecommunications network (e.g., a telephone number, a computer screen name, an e-mail address, etc.), or v. any combination of i, ii, iii, and iv.

For the purpose of this disclosure, a "filtering criterion" is defined as information that distinguishes a telecommunications message from the Second Person from a telecommunications message from at least one other person. For example, the filtering criterion includes, but is not limited to:

i. an address in the address space of a telecommunications network, or ii. an indication of the identity of a person, and iii. a combination of i and ii.

In accordance with the first illustrative embodiment, the distinguishing factor is an image of the user's face (i.e., a portrait of the user), and the filtering criterion is the telephone number of the terminal.

Figure 4:
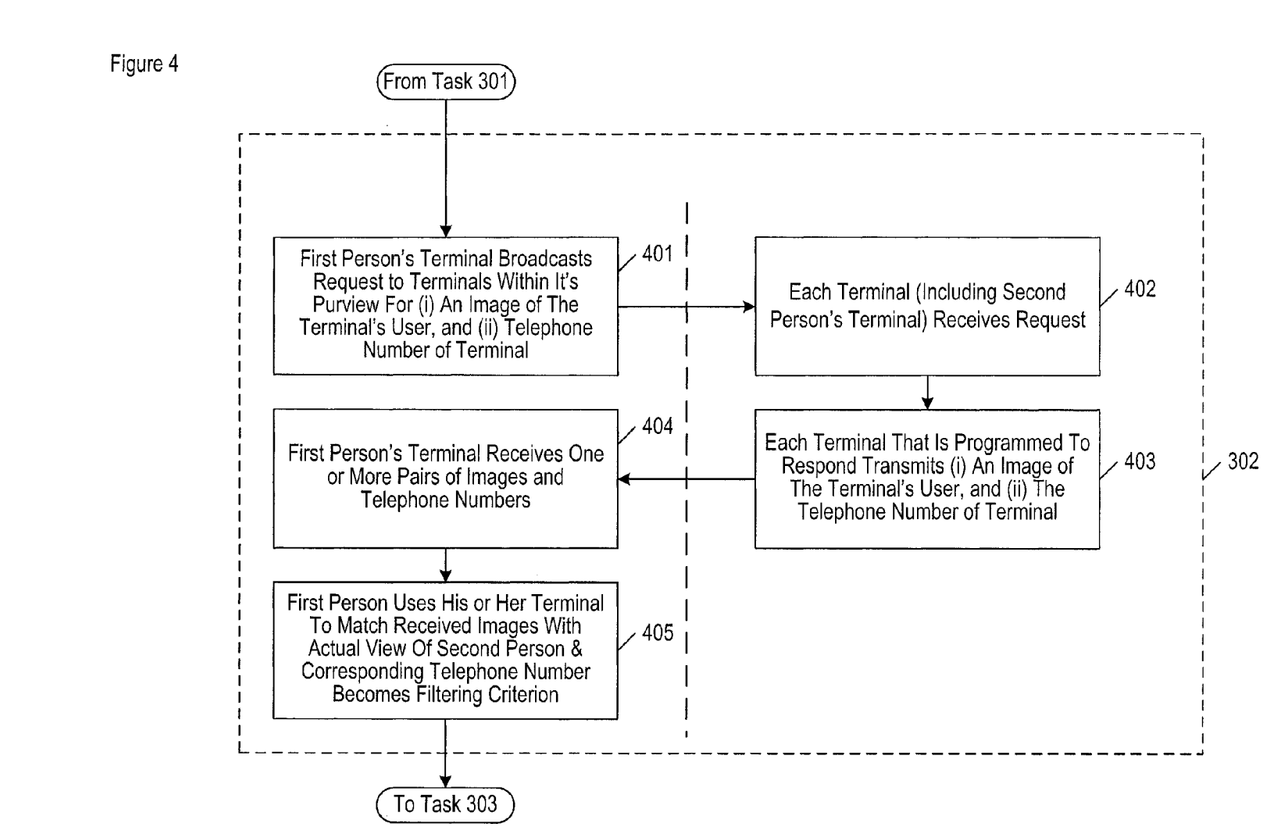
FIG. 4 depicts a flowchart of the salient tasks associated with task 302 in FIG. 3.

FIG. 4 depicts a flowchart of the salient subtasks associated with the performance of task 302 in accordance with the first illustrative embodiment At task 401, the First Person's terminal broadcasts a request to all of the other terminals for (i) one or more distinguishing factors, and (ii) one or more filtering criterion for that user. In accordance with the first illustrative embodiment, the First Person's terminal requests an image of the terminal's user as the distinguishing factor and the telephone number of the terminal as the filtering criterion.

At task 402, all of the other terminals within the purview of the First Person's terminal, including the Second Person's terminal, receive the request transmitted in task 401.

At task 403, all of the terminals that are programmed to respond to the request, including the Second Person's terminal, do so.

At task 404, the First Person's terminal receives a distinguishing factor-filtering criterion pair from each of the responding terminals.

At task 405, the First Person compares the images he or she has received with his or her actual view of the Second Person and indicates to his or her terminal which of the images corresponds to the Second Person. The terminal then selects the telephone number that was received with that image as the filtering criterion for use in tasks 303 through 306.

Because the First Person's terminal was given the image-address pairs, the task of determining the filtering criterion based on the distinguishing characteristic is simple. But as alluded to previously and as described below and in conjunction with the second illustrative embodiment, the task of determining the filtering criterion based on the distinguishing characteristic can be more complex. For example, it will be clear to those skilled in the art however, after reading this disclosure, how to make and use alternative embodiments of the present invention in which the First Person's terminal generates the distinguishing factor itself (e.g., with a camera to take the Second Person's picture, etc.) or acquires it from another entity (e.g., a remote data processing system, etc.). One example of this is described below and in conjunction with the second illustrative embodiment.

As part of task 302, the First Person compares, with his or her terminal, the images in the responses to the physical traits of the Second Person. When the First Person has determined which of the images corresponds to the Second Person, the First Person indicates that determination to the terminal. In accordance with the first illustrative embodiment the First Person's terminal is simply given the filtering criterion by the Second Person's terminal, and the association between the filtering criterion and the distinguishing factor. It will be clear to those skilled in the art however, after reading this disclosure, how to make and use alternative embodiments of the present invention in which the First Person's terminal uses the distinguishing factor to determine (e.g., through a pattern matching process, through a lookup process, etc.) the filtering criterion. This can, for example, involve the use of local or remote databases and can also, for example, involve the cooperation of remote data processing systems. One example of this is described below and in conjunction with the second illustrative embodiment.

At task 303, the First Person indicates to his or her terminal his or her interest in communicating with the Second Person and does this by directing the terminal to reveal to him or her the existence and complete content of any messages that have been sent, or might be sent, from the Second Person (as identified by his or her filtering criterion). In accordance with the first illustrative embodiment, the First Person expresses either:

(1) an active interest to communicate with the Second Person, or (2) a passive interest to communicate with the Second Person.

When the First Person expresses an active interest in communicating with the Second Person, the First Person's terminal sends a message to the Second Person using the filtering criterion determined in task 302. The message comprises:

i. an indication of the identity of the First Person (e.g., the identity of the First Person, an image of the First Person, etc.), and ii. the First Person's filtering criterion (e.g., Bluetooth network address, etc.), iii. a subject (e.g., "Message From An Admirer," etc.), and iv. content (e.g., "Can I buy you a drink?" etc.).

When, in contrast, the First Person expresses a passive interest to communicate with the Second Person, the First Person does not send a message to the Second Person but informs his or her terminal that he or she is willing to communicate with the Second Person if it receives a message from the Second Person.

As described below and with respect to FIG. 5, the advantage of active interest is that it alerts the Second Person that he or she has a suitor, and, therefore, might prompt the Second Person to express an interest (either active or passive) to communicate with the First Person when he or she might otherwise not. The disadvantage of active interest is that the pain of rejection is increased if the Second Person does not express an interest to communicate.

In contrast, the advantage of passive interest is that it lessens the pain of rejection if the Second Person does not express an interest to communicate. The disadvantage with passive interest is that if both the First Person and the Second Person indicate passive interest with respect to each other, a deadlock arises and nothing materializes even though both persons are interested in each other.

In either case, as part of task 303, the telephone number of the Second Person is stored in a List of Admired Persons that is permanently stored in the First Person's terminal. An example of such a list is depicted in Table 1. As described below and with respect to FIG. 5, this list is used by the terminal when messages arrive for the First Person to enable the terminal to discern which messages are from acceptable Second Persons and which are not.

TABLE 1

| List of Admired Persons Telephone Number (filtering criterion) |
|---|
| 201-555-2343 |
| 323-443-5523 |
| 345-646-3342 |
| 532-343-6681 |

At task 304, the First Person's terminal determines if the Second Person has previously expressed an interest in communicating with the First Person. This is necessary because the First Person's terminal might have previously received a message from the Second Person and which message was partially or wholly hidden from the First Person. This situation is likely because the First Person might be performing this series of tasks in response to the receipt of a message from the Second Person. In either case, the Second Person's telephone number is searched for in a List of Admirers (i.e., those people who have sent the First Person a message that was partially or wholly hidden from the First Person) that is permanently stored in the First Person's terminal. An example of such a list is depicted in Table 2.

TABLE 2

| List of Admirers Telephone Number |
|---|
| 574-587-2541 |
| 965-852-3854 |
| 532-343-6681 |
| 201-587-6936 |
| 568-985-9699 |
| 542-875-8785 |

How and when Table 2 is populated is described below and with respect to FIG. 5. When the Second Person's telephone number is within the List of Admirers, control passes to task 306; otherwise control stops.

At task 305, the First Person's terminal alerts the First Person to the fact that the Second Person has previously sent the First Person a message, and, therefore, has previously expressed an interest to communicate. As part of task 305, the First Person's terminal reveals to the First Person the entire messages that was received from the Second Person.

At task 306, the First Person's terminal initiates a voice call with the Second Person's terminal so that the First Person and the Second Person can freely communicate. It will be clear to those skilled in the art, after reading this disclosure, how to make and use alternative embodiments of the present invention in which the communication in task 306 is through text, voice, or video.

FIG. 5 depicts a flowchart of the salient tasks associated with the First Person and his or her terminal when the First Person receives a message of admiration transmitted from a Second Person.

At task 501, the First Person's terminal receives a message transmitted from a Second Person. The message comprises:
   i. an indication of the identity of the Second Person,
   ii. the Second Person's terminal's telephone number,
   iii. a subject, and
   iv. content.

At task 502, the First Person's terminal determines if the First Person has ever expressed an interest (either active or passive) in communicating with the Second Person. Task 502 is accomplished by searching for the Second Person's telephone number in the First Person's List of Admired Persons. If the Second Person's telephone number is in the List of Admired Persons, then control passes to task 503; otherwise control passes to task 505.

At task 503, the First Person's terminal alerts the First Person to the arrival of the message and provides the user with the message.

At task 504, the First Person's terminal initiates a text messaging session with the Second Person's terminal so that the First Person and the Second Person can freely communicate. It will be clear to those skilled in the art, after reading this disclosure, how to make and use alternative embodiments of the present invention in which the communication in task 504 is through voice or video.

At task 505, the First Person's terminal alerts the First Person to the arrival of the message, and provides the First Person with:
   i. the subject of the message, but withholds:
     i. information that identifies the Second Person, and
     ii. the Second Person's terminal's telephone number, and
     iii. the content of the message.

Upon the receipt of the message from the Second Person, the First Person might be prompted to look around and consider sending a message to someone he or she admires. If that happens to be the Second Person, then a match is made. In some alternative embodiments of the present invention, all of the message and also its existence are withheld from the admired person until the admired person expresses an interest in communicating with the admirer.

As part of task 505, the First Person's terminal adds the Second Person's terminal's telephone number to its List of Admirers, as depicted in Table 2. After task 505, control stops.

The first illustrative embodiment illustrates just one way in which the various telecommunications terminals can operate independently and without the assistance of a remote data processing system. Although there are advantages to this, there are disadvantages as well, and, therefore, the second illustrative embodiment illustrates one way in which the various telecommunications terminals can operate in conjunction with a data processing system.

Figure 6:
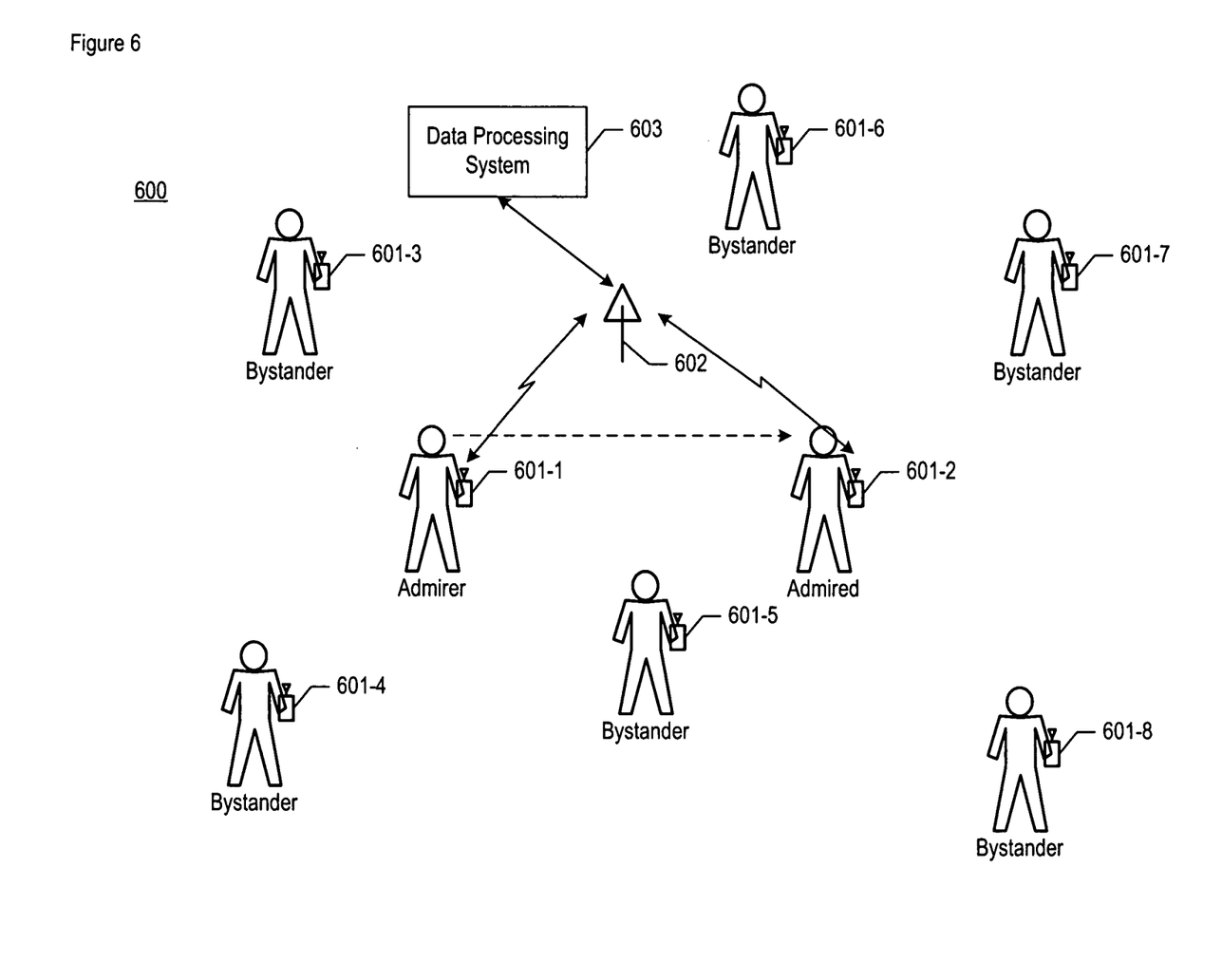
FIG. 6 depicts a diagram of an environment in which the second illustrative embodiment of the present invention operates.

FIG. 6 depicts a diagram of an environment in which the second illustrative embodiment of the present invention operates. Environment 600, like environment 100 in FIG. 1, is a gathering of eight people within line-of-sight proximity of each other. The fact that the people are within line-of-sight proximity of each other is a salient characteristic of the second illustrative embodiment because it, like the first illustrative embodiment, facilitates the introduction of people who are in actual physical proximity to one another and can see each other.

One of the people in the gathering, the "First Person," sees another person, the "Second Person," and desires to anonymously initiate communications with the him or her. The other people who are present at the gathering are merely bystanders.

In accordance with the second illustrative embodiment, each person carries a telecommunications terminal that facilitates the introduction of the First Person and the Second Person.

Figure 7:
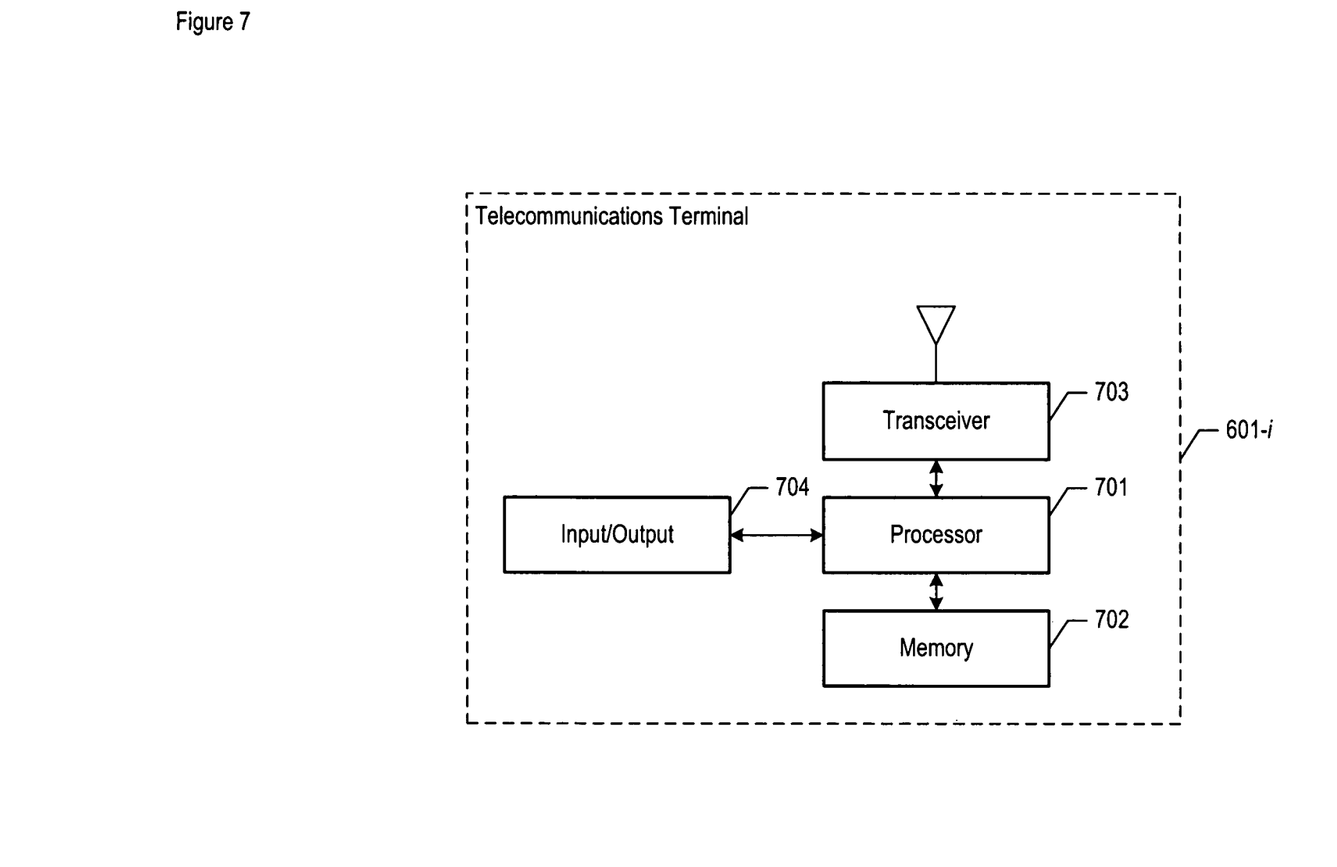
FIG. 7 depicts a block diagram of the salient components of wireless terminal 601-*i*, for i=1 through 8.

FIG. 7 depicts a block diagram of the salient components of wireless terminal 601-$i$, for $i=1$ through 8. In accordance with the second illustrative embodiment, wireless terminal 601-$i$ is distinguishable and addressable by an address in the address space of the telecommunications system in which it functions. This is important because each user's terminal's address serves as an identifier for the user such that:

i. a message addressed to the address of a user's wireless terminal can be considered a message to the user, and ii. a message from the address can be considered a message from the user.

Wireless terminal 601-*i* comprises processor 701, memory 702, transceiver 703, and input/output 705.

Processor 701 is a general-purpose processor, in well-known fashion, that is capable of interacting with memory 702, transceiver 703, and input/output 704 in well-known fashion, and that is additionally capable of performing the functionality described below and with respect to FIGS. 8 and 9.

Memory 702 is a non-volatile random-access memory, in well-known fashion, that stores the operating system and application software for processor 701. In accordance with the first illustrative embodiment, memory 702 also stores an image (e.g., a picture, etc.) of the user associated with the terminal.

Transceiver 703 is a bi-directional radio transceiver, in well-known fashion, that enables wireless terminal 101-*i* to communicate voice, text, and video with the other wireless terminals directly (e.g., through a Bluetooth network, etc.), through a base station (e.g., a WiFi access point, etc.) (not shown in FIG. 1), and with remote data processing systems that are accessible via a base station access point, etc.

Input/output 704 comprises a keypad, display, camera, and acoustic transducers, in well-known fashion, which enable a user to communicate via voice, text, and video.

It will be clear to those skilled in the art, after reading this disclosure, how to make and use alternative embodiments of the present invention in which one or both of the First Person's terminal and the Second Person's terminal are wireline terminals. Furthermore, it will be clear to those skilled in the art, after reading this disclosure, how to make and use alternative embodiments of the present invention that are part of a different system (e.g., a wireless local area network, the Internet, a Bluetooth network, etc.) and, therefore, are distinguishable and addressable by an address (e.g., an IPV6 address, a MAC address, etc.) in a different address space. And still furthermore, it will be clear to those skilled in the art how to make and use alternative embodiments of the present invention for purposes other than dating and romance (e.g., to facilitate business dealings, etc.).

In accordance with the second illustrative embodiment, the First Person's terminal communicates at the physical layer with base station 602. Furthermore, in accordance with the second illustrative embodiment, the First Person's terminal communicates at the application layer with data processing system 603.

In accordance with the second illustrative embodiment, data processing system 603 continually runs software that enables each person to be both:

i. an admirer, and ii. an admired person.

Figure 8:
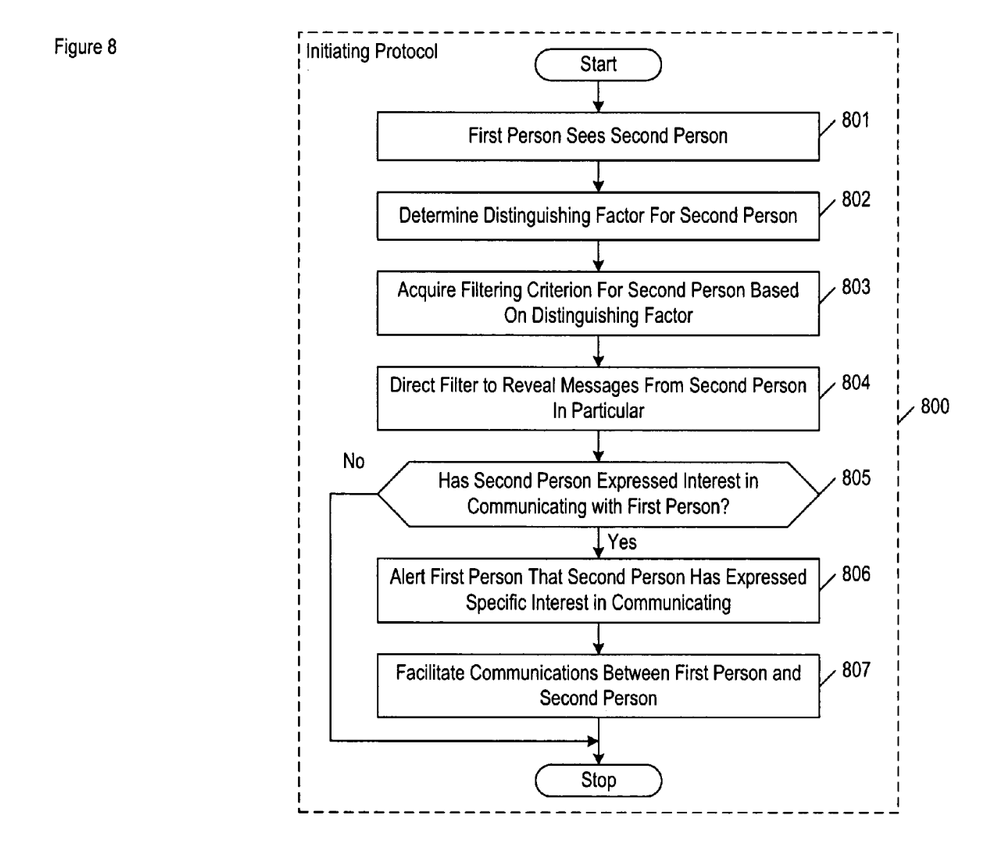
FIG. 8 depicts a flowchart of the salient tasks performed by a data processing system, in accordance with the second illustrative embodiment, to enable a person to be an admirer.
Figure 9:
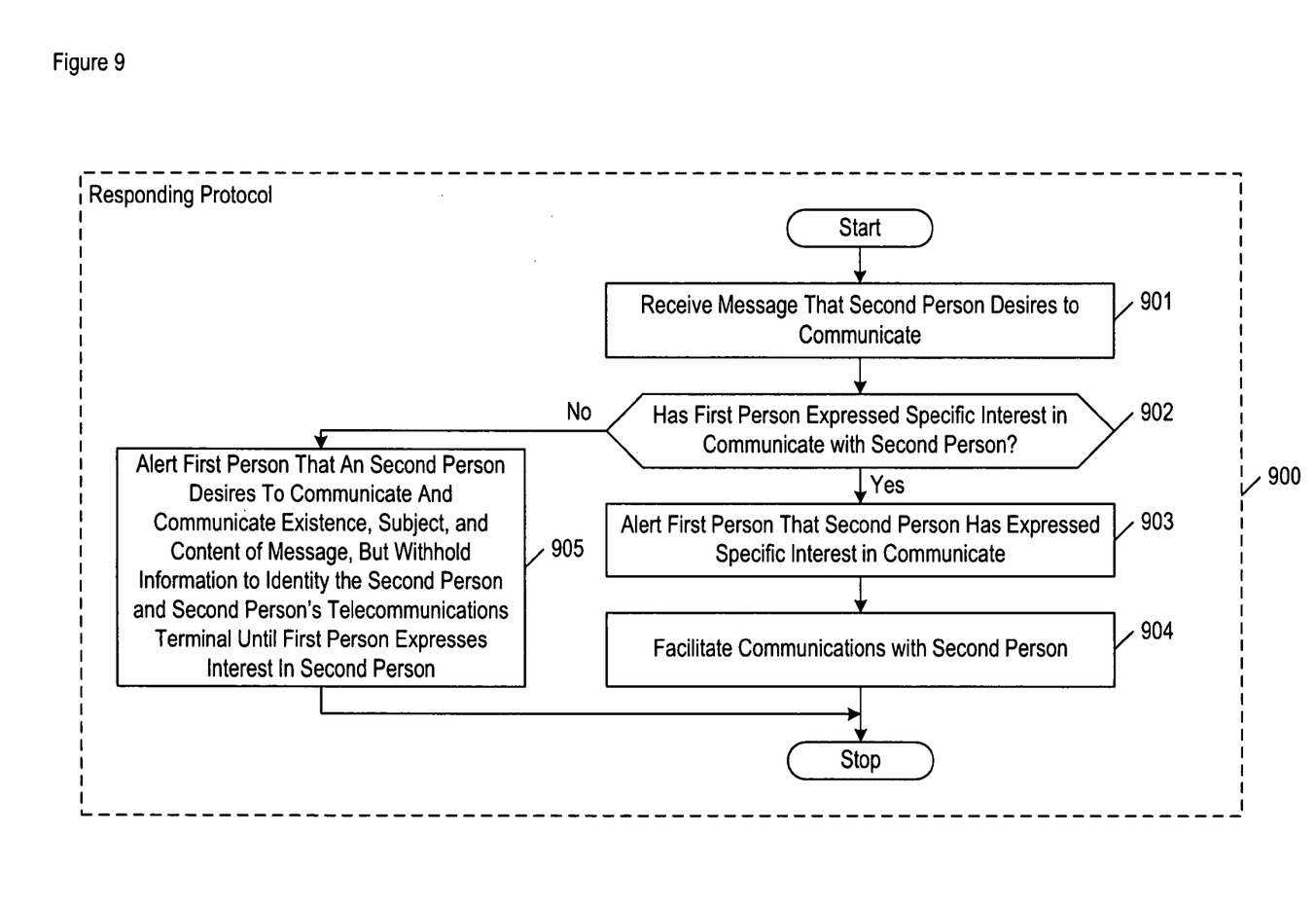
FIG. 9 depicts a flowchart of the salient tasks performed by a data processing system, in accordance with the second illustrative embodiment, to enable a person to be an admired person.

The functionality depicted in FIG. 8 enables a person, via his or her terminal, to be an admirer, and the functionality depicted in FIG. 9 enables a person, via his or her terminal, to be an admired person.

With respect to task 801 in FIG. 8, the First Person sees the Second Person.

At task 802, the First Person acquires one or more distinguishing factors for the Second Person by capturing an image (e.g., taking a picture, etc.) of the Second Person with his or her terminal.

At task 803, the First Person transmits the image to data processing system 603, which contains a database of image/username pairs. As part of task 803, data processing system 603 uses facial recognition software to match the received image to one of the images in its database, and, therefore determines the filtering criterion (e.g., username) for the Second Person. Data processing system 603 then notifies the First Person that it has successfully identified the Second Person.

At task 804, the First Person indicates to data processing system 603, via his or her terminal, his or her interest in communicating with the Second Person and does this by directing data processing system 603 to reveal to him or her the existence and complete content of any messages that have been sent, or might be sent, from the Second Person (as identified by his or her filtering criterion). In accordance with the second illustrative embodiment, the First Person expresses either:

(1) an active interest to communicate with the Second Person, or (2) a passive interest to communicate with the Second Person.

When the First Person expresses an active interest in communicating with the Second Person, the First Person's terminal sends a message to the Second Person through data processing system 603 using the filtering criterion determined in task 802. The message comprises:

i. an indication of the identity of the First Person (e.g., the identity of the First Person, an image of the First Person, etc.), and ii. the First Person's filtering criterion (e.g., Bluetooth network address, etc.), iii. a subject (e.g., "Message From An Admirer," etc.), and iv. content (e.g., "Can I buy you a drink?" etc.).

In either case, as part of task 803, the username of the Second Person is stored in a List of Admired Persons that is permanently stored in data processing system 603. An example of such a list is depicted in Table 3.

TABLE 3

| List of Admired Persons UserName (filtering criterion) |
|---|
| HotBunny |
| 2Sexy4U |
| CharleneZZZ |
| LILSweetie |

At task 805, data processing system 603 determines if the Second Person has previously expressed an interest in communicating with the First Person. This is necessary because the First Person's terminal might have previously received a message from the Second Person, which message was partially or wholly hidden from the First Person by data processing system 603. This situation is likely because the First Person might be performing this series of tasks in response to the receipt of a message from the Second Person. In either case, the Second Person's username is searched for in a List of Admirers (i.e., those people who have sent the First Person a message that was partially or wholly hidden from the First Person) that is permanently stored in the data processing system. An example of such a list is depicted in Table 4.

TABLE 4

| List of Admirers UserName |
|---|
| RU4ME |
| MarysHot |

TABLE 4-continued

List of Admirers
UserName

Shelle
LoveLorn
BarbieQ

How and when Table 4 is populated is described below and with respect to FIG. 9. When the Second Person's username is within the List of Admirers, control passes to task 806; otherwise control stops.

At task 806, data processing system 603 directs the First Person's terminal to alert the First Person to the fact that the Second Person has previously sent the First Person a message, and, therefore, has previously expressed an interest to communicate. As part of task 806, data processing system 603 transmits to the First Person's terminal the entire messages that was received from the Second Person.

At task 807, data processing system 603 initiates a text-messaging session between the First Person's terminal and the Second Person's terminal so that the First Person and the Second Person can freely communicate. It will be clear to those skilled in the art, after reading this disclosure, how to make and use alternative embodiments of the present invention in which the communication in task 806 is through text, voice, or video.

FIG. 9 depicts a flowchart of the salient tasks performed by data processing system when a message is sent from a Second Person to a First Person.

At task 901, data processing system 603 terminal receives a message transmitted from a Second Person to a First Person, wherein both persons are identified by their respective usernames. The message comprises:
 i. an indication of the identity of the Second Person,
 ii. the Second Person's username,
 iii. a subject, and
 iv. content.

At task 902, data processing system 603 determines if the First Person has ever expressed an interest (either active or passive) in communicating with the Second Person. Task 902 is accomplished by searching for the Second Person's username in the First Person's List of Admired Persons. If the Second Person's username is in the First Person's List of Admired Persons, then control passes to task 903; otherwise control passes to task 905.

At task 903, data processing system 603 transmits a message to the First Person's terminal to alert the First Person to the arrival of the message and provides the user with the message.

At task 904, data processing system 603 initiates a text-messaging session between the Second Person's terminal and the First Person's terminal so that the Second Person and the First Person can freely communicate. It will be clear to those skilled in the art, after reading this disclosure, how to make and use alternative embodiments of the present invention in which the communication in task 904 is through text, voice, or video.

At task 905, data processing system 603 transmits to the First Person's terminal to alert the First Person to the arrival of the message and provides the First Person with:
 i. the subject of the message.
Data processing system 603 withholds from the Fourth First Person's terminal:
 i. information that identifies the Second Person, and
 iii. the Second Person's terminal's username, and
 ii. the content of the message.

Upon the receipt of the message from the Second Person, the First Person might be prompted to look around and consider sending a message to someone he or she admires. If that happens to be the Second Person, then a match is made. As part of task 905, data processing system 603 adds the Second Person's terminal's username to its List of Admirers, as depicted in Table 4. After task 905, control stops. In some alternative embodiments of the present invention, all of the message and also its existence are withheld from the admired person until the admired person expresses an interest in communicating with the admirer.

It will be clear to those skilled in the art, after reading this disclosure, how to make and use alternative embodiments of the present invention in which the First Person's terminal withholds some or all of the subject or content of the message from the First Person.

It is to be understood that the illustrative embodiment of the present invention is merely one embodiment of the invention and that many variations of the illustrative embodiment can be made and used without departing from the scope of the invention. For this reason, these variations are to be included within the scope of the following claims and their equivalents.

What is claimed is:

1. A method of interpersonal communications performed by at least one of: (i) at least one device, or (ii) a data processing system, the method comprising:
 determining that a first message is received, said first message being from a particular person and addressed to a particular user of a telecommunications terminal, wherein said telecommunications terminal is a wireless mobile device;
 directing said telecommunications terminal to convey to said user a first portion of said first message from said person, wherein said directing to convey said first portion: (a) is performed while said person is within a physical proximity to said user that is close enough to allow being observable to said user, and (b) at least indicates to said user the existence of said first message without providing information that would enable said user to visually identify said person in said user's physical environment as a person who has expressed interest in said user in particular;
 determining, based on said user indicating descriptive information of at least one of appearance or spatial position of said person while said person is within said physical proximity to said user, at least one of an address associated with said person in the address space of a telecommunications network or an indication of identity of said person; and
 directing said telecommunications terminal to convey to said user at least a second portion of said first message, wherein said directing said telecommunications terminal to convey to said user at least said second portion (a) is performed after said determining said at least one of an address or indication of identity of said person, (b) is performed while said person is within said proximity of said user, (c) at least conveys to said user information that is not conveyed by said directing to convey at least said first portion and (d) at least one of: (i) facilitates subsequent electronic communication between said user and said person or (ii) provides information that allows said user to visually identify said person in said user's physical environment as a person who has expressed interest in said user.

2. The method of claim 1, wherein said determining said at least one of an address or indication of identity based on said user indicating said descriptive information comprises (a) receiving said descriptive information of said person, wherein said receiving said descriptive information of said person is indicative of a selection by said user and (b) determining from said descriptive information of said person said at least one of an address associated with said person in the address space of a telecommunications network or an indication of identity of said person.

3. The method of claim 2, wherein said receiving said descriptive information of said person is performed in said telecommunications terminal, said descriptive information of said person being received as input from said user operating said telecommunications terminal.

4. The method of claim 2, wherein said receiving said descriptive information of said person is performed in a data processing system, said descriptive information of said person being received in a transmission from said telecommunications terminal.

5. The method of claim 2 further comprising:
recording an image of said person with a camera in said telecommunications terminal operated by said user, wherein said determining said at least one of an address or indication of identity is based at least on said image of said person.

6. The method of claim 1, wherein said determining said at least one of an address or indication of identity comprises (a) directing to said user information descriptive of at least one of appearance or spatial position of each of one or more persons, including said person, said one or more persons being within said physical proximity of said user, (b) receiving information indicative of said user selecting said person, and (c) determining from said information indicative of said user selecting said person said at least one of an address associated with said person in the address space of a telecommunications network or an indication of identity of said person.

7. The method of claim 6, wherein said directing to said user said information descriptive of at least one of appearance or spatial position of each of said one or more persons within said physical proximity of said user is performed in response to a request from said user.

8. The method of claim 1, further comprising receiving one or more images in said telecommunications terminal in response to a request from said telecommunications terminal for images of one or more people who are in the proximity of said telecommunications terminal, wherein said determining said at least one of an address or indication of identity is based at least on one of said one or more images that is specified by said user.

9. The method of claim 1, wherein each claim step is performed by said telecommunications terminal.

10. The method of claim 1, wherein each claim step is performed by a data processing system.

11. The method of claim 1, wherein said determining that said first message is received comprises receiving said first message in said telecommunications terminal, said first message being received prior to said determining said at least one of an address or indication of identity, and wherein said first message from said person and addressed to said user is at least partially hidden from said user until after said determining said at least one of an address or indication of identity.

12. The method of claim 1, wherein an indication of spatial position of said person is determined in cooperation with said telecommunications terminal, said determining said at least one of an address or indication of identity being based at least on said indication of spatial position of said person.

13. The method of claim 1 further comprising:
determining, based on said person specifying descriptive information of at least one of appearance or spatial position of said user while said user is within a physical proximity to said person that is close enough to allow being observable to said person, at least one of a second address associated with said user in the address space of a telecommunications network or a second indication of identity of said user, wherein said determining said at least one of a second address or second indication of identity of said user is performed prior to said directing said telecommunications terminal to convey to said user said first portion of said first message from said person; and
directing a second telecommunications terminal operated by said person to convey to said person a second message, wherein said directing to convey to said person said second message: (a) is performed after said determining said at least one of an address associated with said person in the address space of a telecommunications network or an indication of identity of said person and (b) at least one of: (i) facilitates subsequent electronic communication between said person and said user, or (ii) provides information that allows said person to visually identify said user in said person's physical environment as a person who has expressed interest in communicating with said person.

14. A method of interpersonal communications performed by at least one of: (i) at least one device or (ii) a data processing system, the method comprising:
determining that a first message is received, said first message being from a particular person and addressed to a particular user of a telecommunications terminal, wherein said telecommunications terminal is a wireless mobile device;
directing a data processing system to convey to said user a first portion of said first message from said person, wherein said directing to convey said first portion: (a) is performed while said person is within a physical proximity to said user that is close enough to allow being observable to said user, and (b) at least indicates to said user the existence of said first message without providing information that would enable said user to visually identify said person in said user's physical environment as a person who has expressed interest in said user in particular;
determining, based on said user indicating descriptive information of at least one of appearance or spatial position of said person while said person is within said physical proximity to said user, at least one of an address associated with said person in the address space of a telecommunications network or an indication of identity of said person; and
directing said data processing system to convey to said user at least a second portion of said first message, wherein said directing said data processing system to convey to said user at least said second portion (a) is performed after said determining said at least one of an address or indication of identity of said person, (b) is performed while said person is within said proximity of said user, (c) at least conveys to said user information that is not conveyed by said directing to convey at least said first portion and (d) at least one of: (i) facilitates subsequent electronic communication between said user and said person, or (ii) provides information that allows said user to visually identify said person in said user's physical environment as a person who has expressed interest in said user.

15. The method of claim 14, wherein said determining said at least one of an address or indication of identity based on said user indicating said descriptive information comprises (a) receiving said descriptive information of said person, wherein said receiving said descriptive information of said person is indicative of a selection by said user and (b) determining from said descriptive information of said person said at least one of an address associated with said person in the address space of a telecommunications network or an indication of identity of said person.

16. The method of claim 15, wherein said receiving said descriptive information of said person is performed in said telecommunications terminal, said descriptive information of said person being received as input from said user operating said telecommunications terminal.

17. The method of claim 15, wherein said receiving said descriptive information of said person is performed in said data processing system, said descriptive information of said person being received in a transmission from said telecommunications terminal.

18. The method of claim 15, wherein said descriptive information of said person is an image of said person that is recorded with a camera in said telecommunications terminal operated by said user.

19. The method of claim 14 further comprising:
receiving in said data processing system an image of said person that is recorded with a camera in said telecommunications terminal operated by said user, wherein said determining said at least one of an address or indication of identity is based at least on said image of said person.

20. The method of claim 14, wherein said determining said at least one of an address or indication of identity comprises (a) directing to said user information descriptive of at least one of appearance or spatial position of each of one or more persons, including said person, said one or more persons being within said physical proximity of said user, (b) receiving information indicative of said user selecting said person, and (c) determining from said information indicative of said user selecting said person said at least one of an address associated with said person in the address space of a telecommunications network or an indication of identity of said person.

21. The method of claim 20, wherein said directing to said user said information descriptive of at least one of appearance or spatial position of each of said one or more persons within said physical proximity of said user is performed in response to a request from said user.

22. The method of claim 14 further comprising:
receiving a request from said telecommunications terminal for images of one or more people who are in the proximity of said telecommunications terminal at the time of said request; and
transmitting at least an image of said person to said telecommunications terminal in response to said request, wherein said determining said at least one of an address or indication of identity is based at least on said image of said person.

23. The method of claim 14, wherein said determining that said first message is received comprises receiving said first message in said data processing system, said first message being received prior to said determining said at least one of an address or indication of identity, and wherein said first message from said person and addressed to said user is at least partially hidden from said user until after said determining said at least one of an address or indication of identity.

24. The method of claim 14, wherein an indication of spatial position of said person is determined in cooperation with said telecommunications terminal, said determining said at least one of an address or indication of identity being based at least on said indication of spatial position of said person.

25. The method of claim 14 further comprising:
determining at least one of a second address associated with said user in the address space of a telecommunications network or a second indication of identity of said user, based on said person specifying descriptive information of at least one of appearance or spatial position of said user while said user is within a physical proximity to said person that is close enough to allow being observable to said person, wherein said determining said at least one of a second address or second indication of identity is performed prior to said directing said data processing system to convey to said user said first portion of said first message from said person; and
directing said data processing system to convey to said person a second message, wherein said directing to convey to said person said second message: (a) is performed after said determining said at least one of an address associated with said person in the address space of a telecommunications network or an indication of identity of said person and (b) at least one of: (i) facilitates subsequent electronic communication between said person and said user, or (ii) provides information that allows said person to visually identify said user in said person's physical environment as a person who has expressed interest in communicating with said person.

26. A method comprising the following steps in the order named:
a) receiving first information in at least one of a device or computer system, said first information being at least indicative of a first person selecting a particular second person;
b) directing a first message to be conveyed to said second person, said directing said first message to be conveyed to said second person (a) being performed in at least one of a device or computer system while said first person is within a physical proximity to said second person that is close enough to allow being observable to said second person, (b) at least indicating to said second person that interest has been expressed in said second person, and (c) withholding information that would enable said second person to visually identify said first person in said second person's physical environment as a person who has expressed interest in said second person in particular;
c) receiving second information in at least one of a device or computer system, said second information comprising information that is descriptive of at least one of: (i) appearance, or (ii) spatial position, of said first person, and said receiving said second information being indicative of said second person selecting said first person; and
d) directing a second message to be conveyed to said second person while said first person is within said physical proximity to said second person, wherein said directing said second message to be conveyed to said second person (a) is performed in at least one of a device or computer system, (b) conveys information not conveyed by said first message, and (c) at least one of (i) facilitates subsequent electronic communication between said second person and said first person, or (ii) provides information that allows said second person to visually identify said first person in said second person's physical environment as a person who has expressed interest in said second person.

27. The method of claim 26, wherein each of said method steps is performed by a computer system.

28. The method of claim 26, wherein each of said method steps is performed by a second device operated by said second person.

29. The method of claim 26, further comprising:
determining, from said information that is descriptive of at least one of appearance or spatial position of said first person received in said second information, at least one of a symbolic representation of identity of said first person or a communication address of said first person.

30. The method of claim 26 wherein said first information comprises information that is descriptive of at least one of appearance or spatial position of said second person.

31. The method of claim 30, further comprising:
determining, at least in part from said information that is descriptive of at least one of appearance or spatial position of said second person, at least one of a symbolic representation of identity or a communication address of said second person; and
determining, at least in part from said information that is descriptive of at least one of appearance or spatial position of said first person, at least one of a symbolic representation of identity or a communication address of said first person.

32. The method of claim 26, further comprising:
directing a third message to be conveyed to said first person, wherein said directing said third message to be conveyed to said first person (a) is performed in at least one of a device or computer system, (b) is performed after said receiving said second information, (c) is performed while said second person is within a physical proximity to said first person that is close enough to allow being observable to said first person, and (d) at least one of (i) facilitates subsequent electronic communication between said first person and said second person, or (ii) provides information that allows said first person to visually identify said second person in said first person's physical environment as a person who has expressed interest in said first person.

33. A method comprising the following steps in the order named:
a) receiving first information in at least one of a device or computer system, said first information being at least indicative of a first person selecting a particular second person;
b) directing a first message to be conveyed to said second person, said directing said first message to be conveyed to said second person (i) being performed in at least one of a device or computer system while said first person is within a physical proximity to said second person that is close enough to allow being observable to said second person, (ii) at least indicating to said second person that interest has been expressed in said second person, and (iii) withholding information that would enable said second person to visually identify said first person in said second person's physical environment as a person who has expressed interest in said second person in particular;
c) directing to be conveyed to said second person information descriptive of observable characteristics of each of one or more persons including said first person, in such a way that allows said second person to indicate, to a second wireless device operated by said second person, a particular person who is observed by said second person in said second person's physical environment, said observable characteristics being characteristics of at least one of appearance or spatial location;
d) receiving second information in at least one of a device or computer system, wherein said receiving said second information is indicative of said second person selecting said first person; and
e) directing a second message to be conveyed to said second person while said first person is within said physical proximity to said second person, wherein said directing said second message to be conveyed to said second person (a) is performed in at least one of a device or computer system, (b) conveys information not conveyed by said first message, and (c) at least one of (i) facilitates subsequent electronic communication between said second person and said first person, or (ii) provides information that allows said second person to visually identify said first person in said second person's physical environment as a person who has expressed interest in said second person.

34. The method of claim 33, wherein said directing to be conveyed to said second person information descriptive of observable characteristics of each of one or more persons is performed in response to a request from said second person.

35. The method of claim 33, further comprising:
directing to be conveyed to said first person, prior to said receiving said first information, information descriptive of observable characteristics of each of one or more persons including said second person, in such a way that allows said first person to indicate, to a first wireless device operated by said first person, a particular person who is observed by said first person in said first person's physical environment, said observable characteristics being characteristics of at least one of appearance or spatial location.

36. The method of claim 35, further comprising:
directing a third message to be conveyed to said first person, wherein said directing said third message to be conveyed to said first person (a) is performed in at least one of a device or computer system, (b) is performed after said receiving said second information, (c) is performed while said second person is within a physical proximity to said first person that is close enough to allow being observable to said first person, and (d) at least one of (i) facilitates subsequent electronic communication between said first person and said second person, or (ii) provides information that allows said first person to visually identify said second person in said first person's physical environment as a person who has expressed interest in said first person.

37. The method of claim 33, wherein each of the steps is performed by a computer system.

38. The method of claim 33, wherein each of the steps is performed by said second device.

* * * * *